(12) United States Patent
Husted et al.

(10) Patent No.: US 6,865,644 B2
(45) Date of Patent: Mar. 8, 2005

(54) SYSTEM AND METHOD FOR INDUSTRIAL CONTROLLER WITH AN I/O PROCESSOR USING CACHE MEMORY TO OPTIMIZE EXCHANGE OF SHARED DATA

(75) Inventors: Raymond R. Husted, Middlefield, OH (US); Ronald E. Schultz, Solon, OH (US); Dennis J. Dombrosky, Lyndhurst, OH (US); David A. Karpuszka, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 223 days.

(21) Appl. No.: 09/915,024

(22) Filed: Jul. 25, 2001

(65) Prior Publication Data

US 2003/0023780 A1 Jan. 30, 2003

(51) Int. Cl.$^7$ .............................................. G06F 13/10
(52) U.S. Cl. ........................ 711/118; 711/113; 710/1; 710/5; 710/49; 712/224; 700/2; 700/18
(58) Field of Search ................................ 711/118, 147, 711/113, 156, 135; 710/1, 5, 23, 48, 49, 262; 712/224; 700/2, 17, 18

(56) References Cited

U.S. PATENT DOCUMENTS

| | | | |
|---|---|---|---|
| 4,553,224 A | | 11/1985 | Struger et al. .................. 710/5 |
| 5,161,219 A | | 11/1992 | Nicholson et al. |
| 5,212,631 A | * | 5/1993 | Schmidt et al. .................. 700/7 |
| 5,225,974 A | | 7/1993 | Mathews et al. .............. 700/11 |
| 5,265,005 A | * | 11/1993 | Schmidt et al. ................ 700/18 |
| 5,295,059 A | * | 3/1994 | Brooks et al. ................. 700/18 |
| 5,685,011 A | | 11/1997 | Rosenthal et al. |
| 5,845,149 A | | 12/1998 | Husted et al. .................. 710/9 |
| 5,867,382 A | | 2/1999 | McLaughlin .................. 700/17 |
| 6,085,263 A | * | 7/2000 | Sharma et al. ................. 710/56 |
| 6,223,266 B1 | * | 4/2001 | Sartore ........................ 711/170 |
| 6,226,753 B1 | | 5/2001 | Arima et al. |
| 6,279,084 B1 | * | 8/2001 | VanDoren et al. ........... 711/141 |
| 6,349,358 B1 | * | 2/2002 | Kuwata ....................... 711/113 |
| 2001/0003187 A1 | * | 6/2001 | Aoki et al. ................... 709/102 |

FOREIGN PATENT DOCUMENTS

DE 44 23 559 A1 5/1995

OTHER PUBLICATIONS

International Search Report, EP 02 01 6569, mailed Feb. 3, 2004.

* cited by examiner

*Primary Examiner*—Mano Padmanabhan
*Assistant Examiner*—Jasmine Song
(74) *Attorney, Agent, or Firm*—Amin & Turocy LLP; R. Scott Speroff

(57) ABSTRACT

A system and method for industrial control I/O forcing is provided. The invention includes a processor, shared memory and an I/O processor with cache memory. The invention provides for the cache memory to be loaded with I/O force data from the shared memory. The I/O processor performs I/O forcing utilizing the I/O force data stored in the cache memory. The invention further provides for the processor to notify the I/O processor in the event that I/O force data is altered during control program execution. The invention further provides for the I/O processor to refresh the cache memory (e.g., via a blocked write) after receipt of alteration of the I/O force data from the processor.

19 Claims, 10 Drawing Sheets

| 1 | 0 | 0 | 0 | 0 | 0 | 0 | 1 | — 202

ACTUAL INPUT(S)

| 1 | 1 | 1 | 1 | 1 | 1 | 1 | 0 | — 204

FORCE OFF MASK

| 1 | 0 | 0 | 0 | 0 | 0 | 0 | 0 | — 206

INTERIM INPUT RESULT

| 0 | 0 | 1 | 0 | 0 | 0 | 0 | 0 | — 208

FORCE ON MASK

| 1 | 0 | 1 | 0 | 0 | 0 | 0 | 0 | — 210

INPUT RESULT

FIG. 3

| 0 | 1 | 0 | 1 | 0 | 1 | 0 | 1 | — 212

OUTPUT DATA

| 1 | 1 | 1 | 1 | 1 | 0 | 1 | 1 | — 214

FORCE OFF MASK

| 0 | 1 | 0 | 1 | 0 | 0 | 0 | 1 | — 216

INTERIM OUTPUT RESULT

| 0 | 0 | 1 | 0 | 0 | 0 | 0 | 0 | — 218

FORCE ON MASK

| 0 | 1 | 1 | 1 | 0 | 0 | 0 | 1 | — 220

OUTPUT RESULT

FIG. 4

SYSTEM AND METHOD FOR INDUSTRIAL CONTROLLER WITH AN I/O PROCESSOR USING CACHE MEMORY TO OPTIMIZE EXCHANGE OF SHARED DATA

TECHNICAL FIELD

The present invention relates to the art of industrial controls and more particularly to methods and systems for I/O forcing using an I/O processor having cache memory.

BACKGROUND OF THE INVENTION

Industrial controllers are special purpose processing devices used for controlling industrial processes, machines, manufacturing equipment, and other factory automation applications. In accordance with a control program or routine, an industrial controller may measure one or more process variables or inputs representative of the status of a controlled process, and change outputs effecting control of the process. The inputs and outputs may be binary, (e.g., on or off), and/or analog assuming a continuous range of values. The control routine may be executed in a series of execution cycles with batch processing capabilities, and may comprise one or more functional units. The measured inputs received from a controlled process and the outputs transmitted to the process may pass through one or more input/output (I/O) modules in a control system, which serve as an electrical interface between the controller and the controlled process, and may be located proximate or remote from the controller. The inputs and outputs may be recorded in an I/O table in processor memory. Input values may be asynchronously read from the controlled process by one or more input modules and output values may be written directly to the I/O table by a processor for subsequent communication to the process by specialized communications circuitry. An output module may interface directly with a controlled process, by providing an output from an I/O table to an actuator such as a motor, valve, solenoid, and the like.

During execution of the control routine, values of the inputs and outputs exchanged with the controlled process pass through the I/O table. The values of inputs in the I/O table may be asynchronously updated from the controlled process by dedicated scanning circuitry. This scanning circuitry may communicate with input and/or output modules over a bus on a backplane or network communications. The scanning circuitry may also asynchronously write values of the outputs in the I/O table to the controlled process. The output values from the I/O table may then be communicated to one or more output modules for interfacing with the process. Thus, a controller processor may simply access the I/O table rather than needing to communicate directly with the controlled process.

In distributed control systems, controller hardware configuration may be facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other control programs or routines.

Various control modules of a distributed industrial control system may be spatially distributed along a common communication link in several racks. Certain I/O modules may thus be located proximate a portion of the control equipment, and away from the remainder of the controller. Data may be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for I/O forcing using an I/O processor having cache memory. The present invention provides for a processor and an I/O processor to be operatively coupled to a shared memory storing, for example, configuration data, I/O force data (e.g., based upon operator input), output data effecting control of the process (e.g., to be sent to actuating device(s)) and/or input data representative of the status of the controlled process (e.g., received from sensing device(s)).

According to an aspect of the present invention, the I/O processor is operatively coupled to a cache memory. The cache memory is selectively loaded with at least a portion of the I/O force data stored in the shared memory. The I/O processor can store information associated with input(s) in the shared memory based at least in part upon input(s) received from sensing device(s) and I/O force data stored in the cache memory. The I/O processor can affect control of the process (e.g., via actuating device(s)) based at least in part upon output information retrieved from the shared memory and I/O force data stored in the cache memory. Typically, input(s) and/or output(s) can change frequently and, as such, are not stored in the cache memory.

Yet another aspect of the present invention provides for the processor to notify the I/O processor (e.g., via a command message) in the event I/O force data is altered during control program execution. The I/O processor can refresh the cache memory after receipt of the notification (e.g., via a "blocked write" to a virtual address in shared memory).

The following description and the annexed drawings set forth in detail certain illustrative aspects of the invention.

These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 3 is an exemplary digital input with force masks applied in accordance with an aspect of the present invention.

FIG. 4 is an exemplary digital output with force masks applied in accordance with as aspect of the present invention.

DETAILED DESCRIPTION OF THE INVENTION

Figure 1:
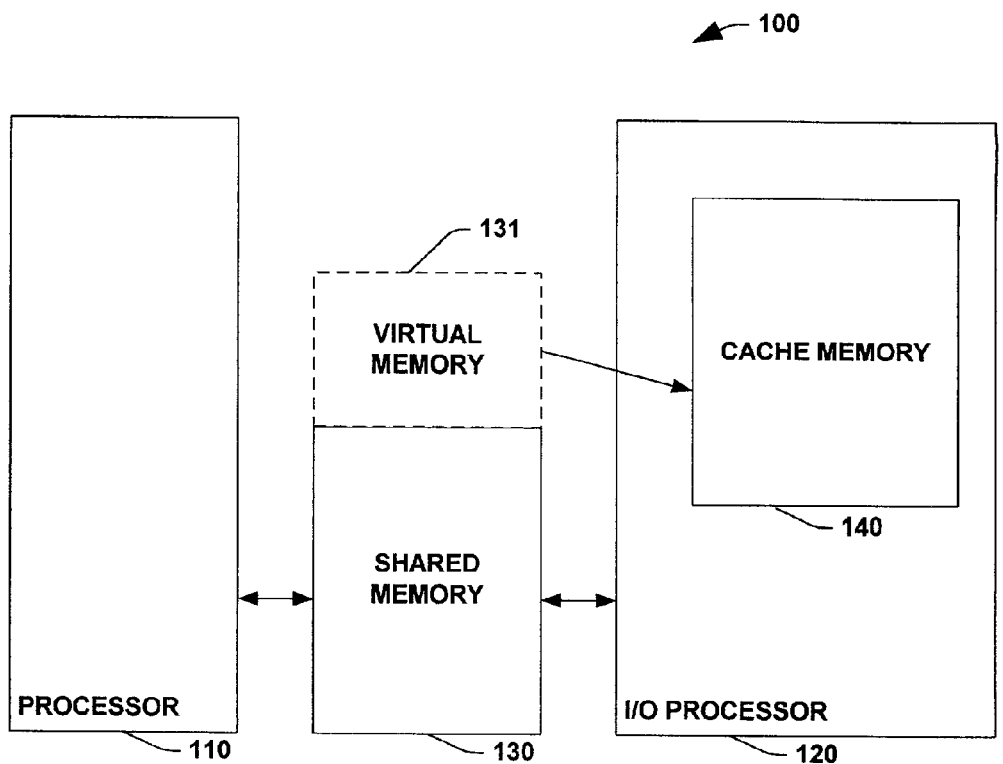
FIG. 1 is a schematic block diagram of an industrial controller system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

Referring to FIG. 1, a system 100 for an industrial controller is illustrated. The system 100 includes a processor 110 and an I/O processor 120. For example, the processor 110 can be a central processing unit (CPU), control processor, logic processor and/or ladder processor for an industrial controller. The I/O processor 120 can generally be dedicated to performing I/O function(s) in a distributed control environment. The processor 110 and the I/O processor 120 are operatively coupled to shared memory 130 (e.g., RAM). For example, the processor 110 and the I/O processor 120 can be connected to the shared memory 130 through a backplane communications bus, which can be serial or parallel or via a network. The I/O processor 120 includes a cache memory 140. The shared memory 130 includes a virtual memory 131 which allows for memory management of the cache memory 140 (e.g., a cacheable, read-only, mirrored image of the shared memory which is addressed through a different address space.)

Figure 2:
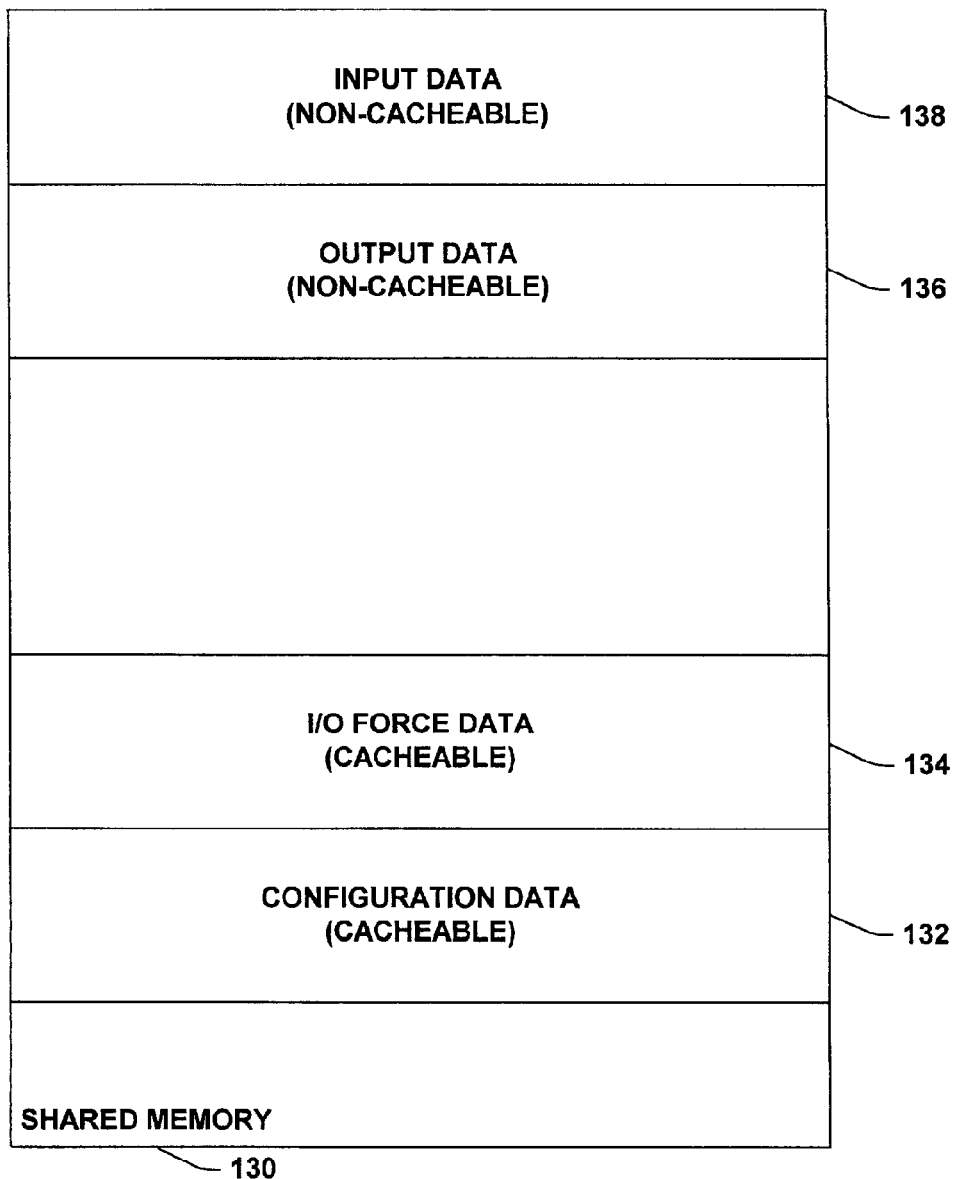
FIG. 2 is a schematic block diagram of shared memory in accordance with an aspect of the present invention.

Turning to FIG. 2, shared memory 130 can include configuration data 132, I/O force data 134, output data 136 and/or input data 138. It is to be appreciated that information stored in configuration data 132, I/O force data 134, output data 136 and/or input data 138 can be stored in any suitable data structure including, but not limited to, table(s), database(s), record(s), array(s) and/or list(s). The input data 138 stores information associated with the state of sensing device(s) coupled to the system 100 (e.g., received via the I/O processor 120). Output data 136 represents the state of output(s) effecting control of the process (e.g., actuating device(s) of equipment and/or control(s)) controlled by the system 100. For example, the output data 136 can store data employed to control actuating device(s)) connected to output type I/O module(s) (not shown). The configuration data 132 can store system level configuration data (e.g., password and/or privilege information, port communication parameter(s) and/or event timeout interval(s)).

I/O force data 134 can store information to force specific input(s) (e.g., received from sensing device(s)) and/or output(s) (e.g., sent to actuating device(s)) to a given logic state. I/O forcing is the use of a predetermined value in a control program instead of the actual value received from an I/O module or outputting a predetermined value to the I/O module instead of the actual value generated by the control program. Forcing is useful, for example, for trouble shooting control programs, trouble shooting industrial control system(s), bypassing inoperable equipment and/or testing of I/O.

Turning to FIGS. 3 and 4, the I/O force data 134 can include a force off mask 204, 214 and/or a force on mask 208, 218 associated with forcing of an I/O module. For input(s), the force off mask 204 is logically AND'd by the I/O processor 120 with the actual input(s) 202 received from the I/O module resulting in an interim result 206. The interim result 206 is then logically OR'd by the I/O processor 120 with the force on mask 208 resulting in an input result value 210 that is stored in input data 138 of the shared memory 130. Once stored in shared memory 130, the input result value 210 is available for use by the control program.

Similarly, for output(s), the force off mask 214 is logically AND'd by the I/O processor 120 with output data 212 retrieved from shared memory 130 by the I/O processor 120 resulting in an interim result 216. The interim output result 216 is then logically OR'd by the I/O processor 120 with the force on mask 220 resulting in an output result value 220 that is then communicated to an I/O module. By having the I/O processor 120 perform certain I/O processing function(s), the processor 110 speed and/or efficiency can be improved.

Both the processor 110 and the I/O processor 120 generally access information stored in the shared memory 130. For example, the I/O processor 120 can store information associated with a sensing device in input data 138 (e.g., input value) which the processor 110 can later access during control program execution. Similarly, the processor 110 can store information associated with an actuating device in output data 136 which the I/O processor 120 can later access and process in performing I/O function(s). Typically, only one of the processor 110 or the I/O processor 120 can access information in shared memory 130 at a given time.

In an industrial control environment, certain information stored in shared memory 130, for example, output data and/or input data, can change value(s) frequently during control program execution. Since this information may be required to be current, it is typically not cached (e.g., to protect against undesirable latency and/or staleness of data.) To the contrary, other information stored in shared memory 130, for example, configuration data and/or I/O force data, typically infrequently changes during control program execution. In order to reduce the I/O processor's 120 frequency of accessing shared memory 130, at least a portion of data stored in shared memory 130 that typically infrequently changes during control program execution (e.g., I/O force data 134) can be stored in the cache memory 140 of the I/O processor 120. For example, the I/O force data 134 can be partitioned in memory separate from the dynamically changing input data 138 and/or output data 136 and/or the entire shared memory 130 can be mirrored at an additional virtual memory space where caching has been enable. The most recent input data 138 and/or output data 136 can be examined in the non-cached shared memory 130; however, the I/O force data 134 can then be access via the cacheable space (e.g., cache memory 140). In the event that typically infrequently changed data has been altered during control program execution, the processor 110 can notify the I/O processor 120 (e.g., via a command message). Once notified that infrequently changed data has altered, the I/O processor 120 can initiate reloading the cache memory 140. For example, once notified that infrequently changed data has been altered, the I/O processor 120 can read from the shared memory 130 and obtain the updated data (e.g., I/O force data 134). Then the I/O processor 120 can write the fresh data to the same virtual location via the cacheable address space, noting that the shared memory location address and the virtual memory address access the same physical location in memory 130 and that the processor 110 has already updated these locations in shared memory 130. The actual write to virtual memory 131 via the I/O processor 120 can be "blocked", thus only the cache memory 140 will actually be updated.

Thus, once notified that infrequently changed data has been altered, the I/O processor 120 can initiate a "blocked write" to the virtual memory. In order to reduce potential data inconsistency, the I/O processor 120 does not actually alter the contents of any memory location during the "blocked write", a purpose of which is to communicate to the cache memory 140 the occurrence of alteration of the infrequently changed data, a portion of which may be stored in the cache memory 140. In accordance with generally recognized cache memory management technology, once the "blocked write" has been initiated by the I/O processor 120, if the address involved in the "blocked write" is stored in cache memory 140, the cache memory will refresh its content(s) from the shared memory 130. Alternatively, the processor 110 can notify the I/O processor 120 of the changed value(s), thus allowing the I/O processor 120 to modify the cache memory 140.

For example, during initialization the processor 110 can load value(s) into the I/O force data 134 (e.g., force off mask(s) 204, 214 and/or force on mask(s) 208, 218)). Thereafter, the I/O processor 120 can load the cache memory 140 with at least a portion of the I/O force data 134. During operation of the system 100, in order to reduce processing load of the processor 110, the I/O processor 120 can perform I/O forcing. In the event that information needed for I/O forcing (e.g., force off mask(s) 204, 214 and/or force on mask(s) 208, 218) is stored in the cache memory 140, accesses of the shared memory 130 by the I/O processor 120 can be reduced thus potentially increasing performance of the processor 110. In the event that I/O force data 134 (e.g., force off mask(s) 204, 214 and/or force on mask(s) 208, 218) is altered during control program execution (e.g., by an operator), the processor 110 can notify the I/O processor 120 of the occurrence of the alteration. Thereafter, in order to ensure coherency of data stored in the shared memory 130 and the cache memory 140, the I/O processor 120 can initiate a "blocked write" associated with the altered shared memory address resulting in the cache memory 140 being updated if data stored in the altered shared memory address had been stored in the cache memory 140.

It is to be appreciated that while the system 100 has been described with respect to I/O force data has been described with respect to binary (e.g., on or off) input(s) and/or output(s), the present invention encompasses analog force data (e.g., assuming a continuous range of values). In the event that analog force data is contained in the I/O force data 134, for output(s), the analog force value(s) would be sent to the actuating device(s) by the I/O processor. Similarly, for input(s), the analog force value(s) would be stored in the shared memory 130.

Additionally, the I/O force data 134 can include enable mask(s) and/or value mask(s). The enable mask(s) provide information regarding the bit(s) of information to be affected while the value mask(s) provide the value for the affected bit(s) of information. Further, the cache memory 140 of the I/O processor 120 can store information that generally is infrequently changed during control program execution, for example, configuration data, I/O fail safe information, connection table(s) (e.g., information related to connection(s) for input(s) and/or output(s)), output keep alive table(s) (e.g. information related to frequency and location of keep alive message(s) for output module(s)) and/or input time-out information.

In view of the exemplary systems shown and described above, methodologies, which may be implemented in accordance with the present invention, will be better appreciated with reference to the flow charts of FIGS. 5, 6, 7 and 8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. In addition, it will be appreciated that the exemplary methods 500, 700 and other methods according to the invention may be implemented in association with the industrial control system illustrated and described herein, as well as in association with other systems and apparatus not illustrated or described.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 5:
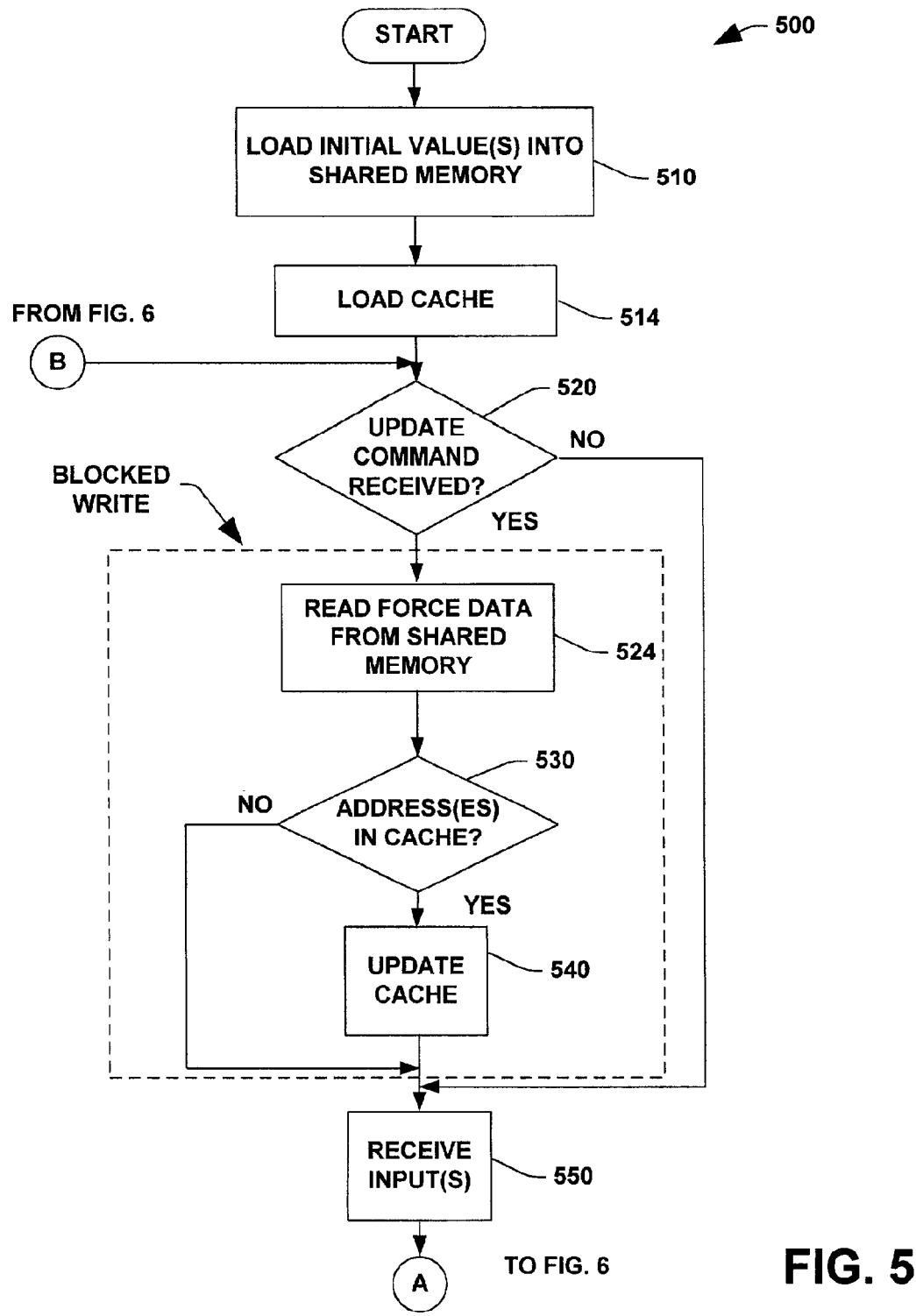
FIG. 5 is a flow chart illustrating a methodology for caching I/O force mask(s) for input(s) in accordance with an aspect of the present invention.
Figure 6:
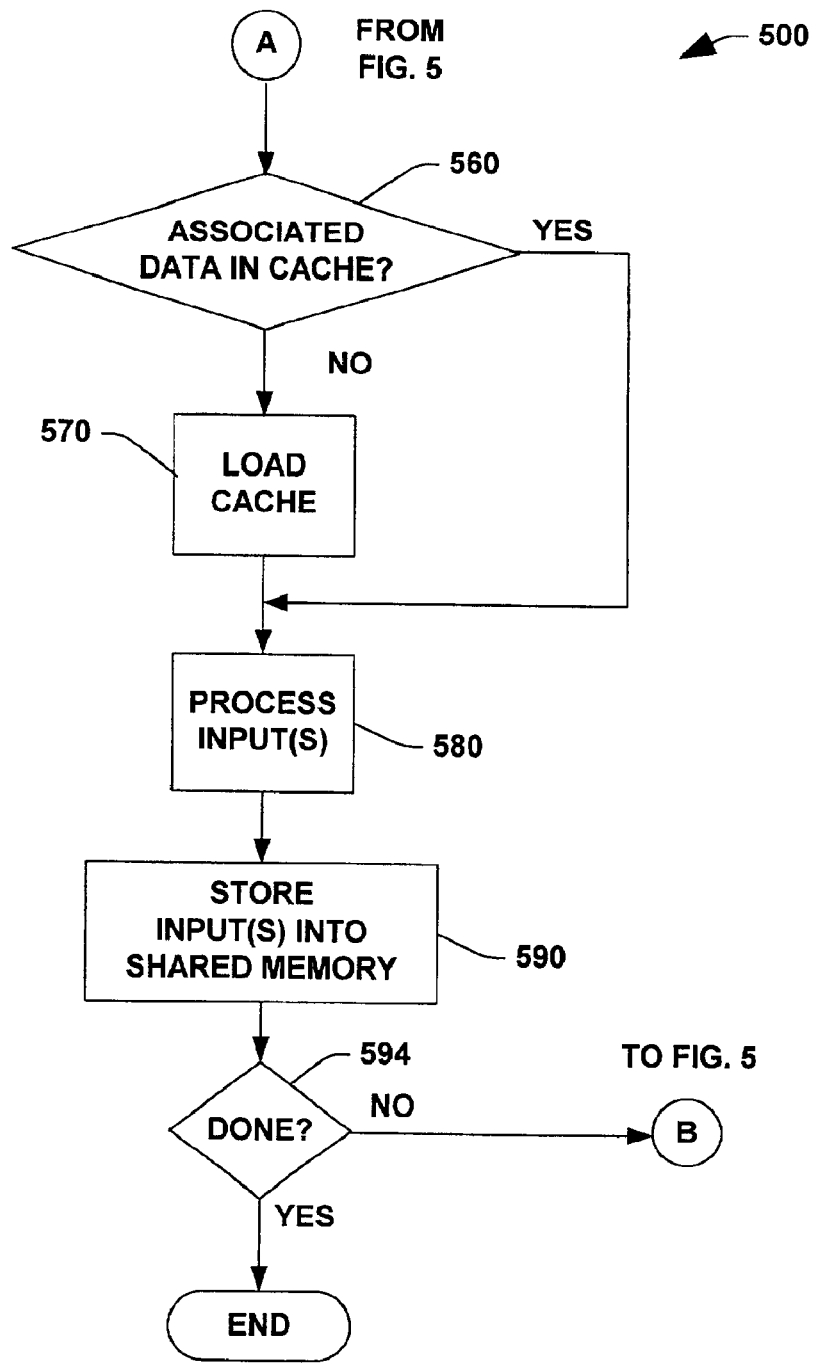
FIG. 6 is a flow chart further illustrating the methodology of FIG. 5.

Turning to FIGS. 5 and 6, a methodology 500 for caching I/O force mask(s) for input(s) in accordance with an aspect of the present invention is illustrated. At 510, initial value(s) (e.g., of configuration data 132, I/O force data 134, output data 136 and/or input data 138) are loaded into shared memory 130. At 514, the cache memory 140 of the I/O processor 120 is loaded with infrequently changed data comprising at least a portion of the shared memory 130 (e.g., I/O force data 134). At 520, a determination is made by the I/O processor 120 as to whether an update command message has been received from the processor 110. If the determination at 520 is NO, processing continues at 550. If the determination at 520 is YES, at 524 the I/O processor 120 initiates at blocked write to the address(es) in shared memory 130 associated with the update command (e.g., shared memory address(es) whose value(s) changed). At 530, at determination is made at to whether data from the address(es) associated with the update command are stored in cache memory 140 (e.g., by cache memory controller hardware, firmware and/or software (not shown)). If the determination at 530 is NO, processing continues at 550. If the determination at 540 is YES, at 540, the cache memory 140 is updated (e.g., data read from shared memory 130). At 550, input value(s) are received by the I/O processor 120 (e.g., from I/O module(s)). At 560, a determination is made whether data associated with the input(s) (e.g., I/O force data 134, for example, force off mask 204 and/or force on mask 208) is stored in the cache memory 140. If the determination at 560 is YES, processing continues at 580. If the determination at 560 is NO, at 570, the cache memory 140 is loaded with data associated with the input(s) (e.g., I/O force data 134) from shared memory 130. At 580, the input(s) are processed (e.g., the input received from the I/O module can be logically AND'd with the force off mask 204 and the result thereof logically OR'd with the force on mask 208). At 590, the processed input value is stored into shared memory 130. At 594, a determination is made as to whether the I/O processor is done (e.g., control program execution completed). If the determination at 594 is NO, processing continues at 520. If the determination at 594 is YES, no further processing occurs.

Figure 7:
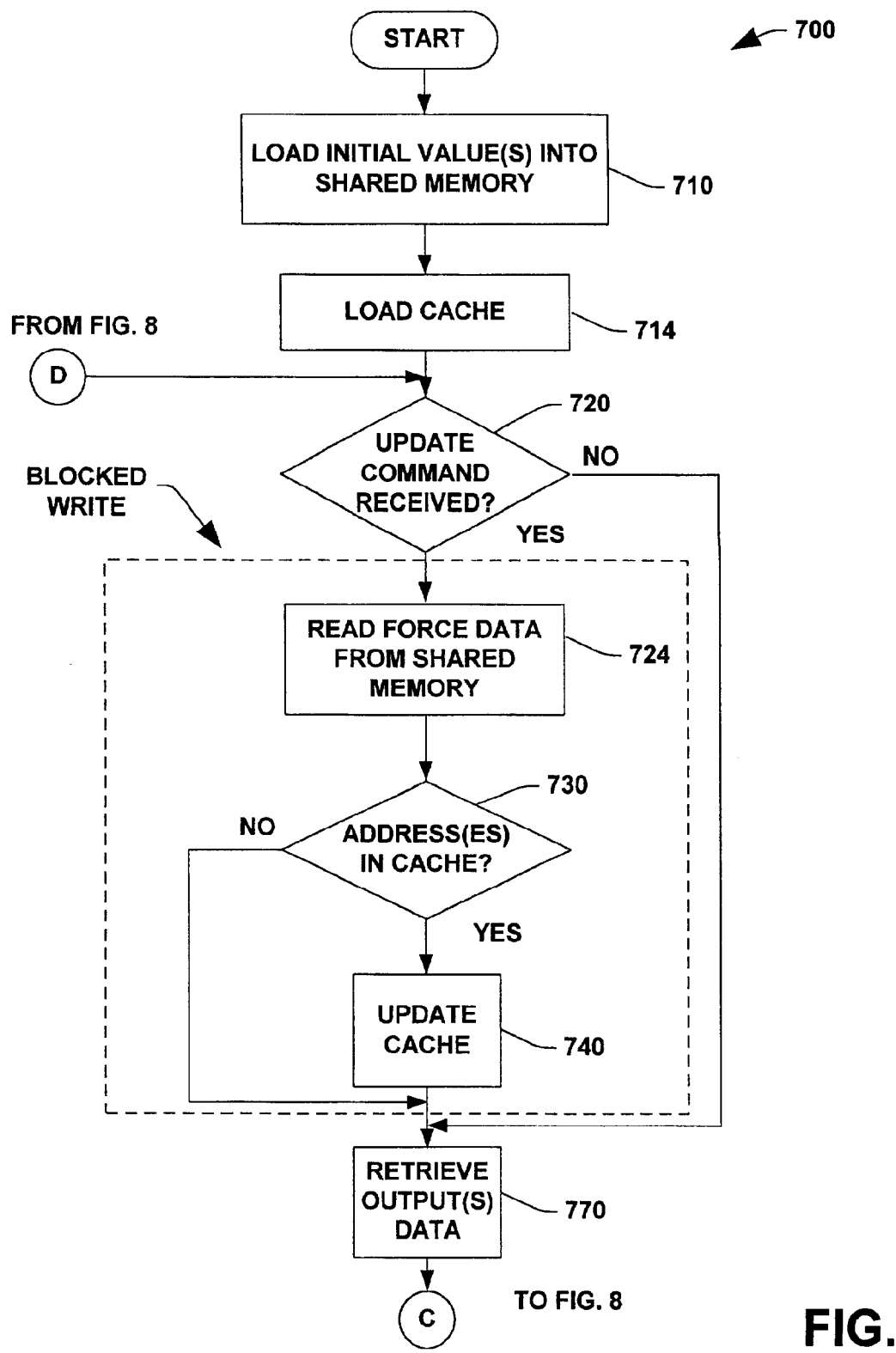
FIG. 7 is a flow chart illustrating a methodology for caching I/O force mask(s) for output(s) in accordance with an aspect of the present invention.
Figure 8:
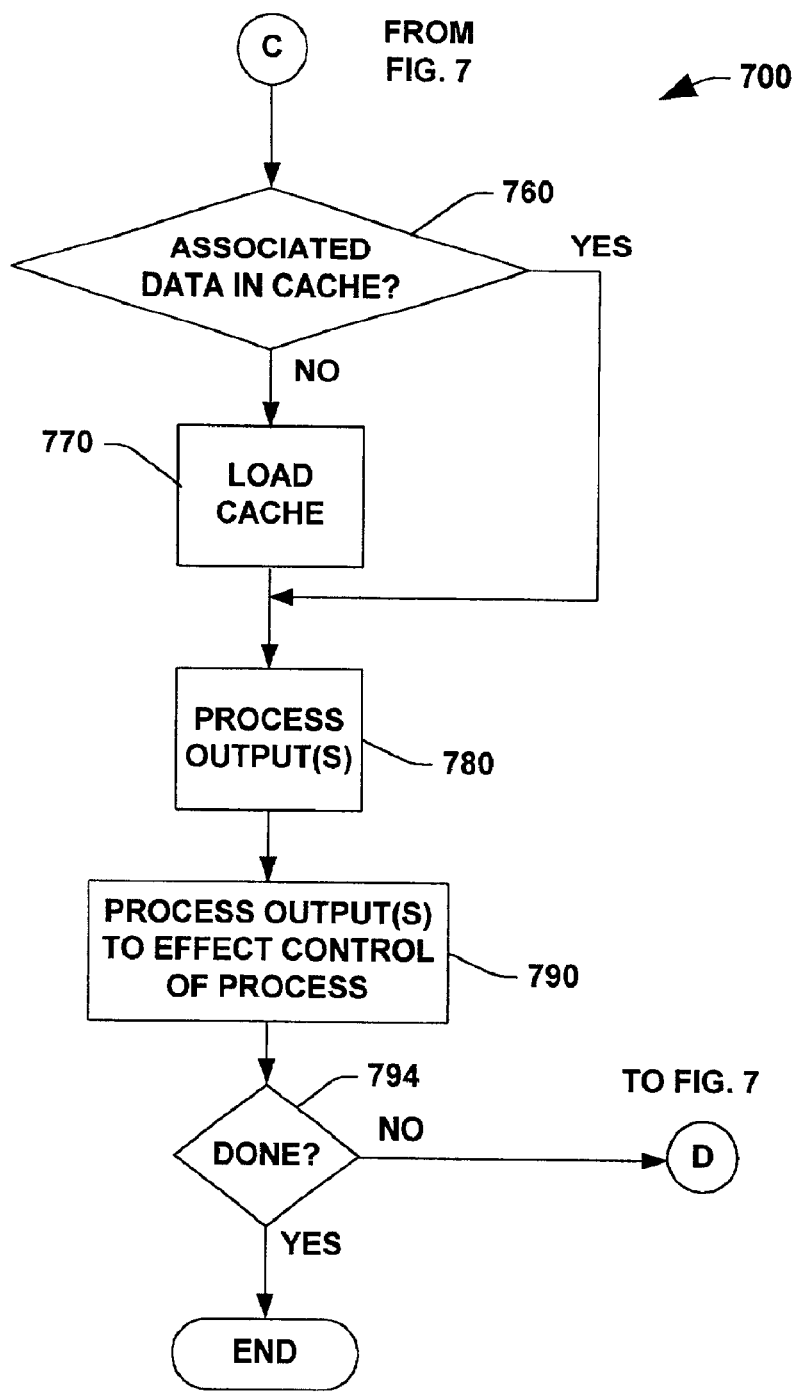
FIG. 8 is a flow chart further illustrating the methodology of FIG. 7.

Referring to FIGS. 7 and 8, a methodology 700 for caching I/O force mask(s) for output(s) in accordance with an aspect of the present invention is illustrated. At 710, initial value(s) (e.g., of configuration data 132, I/O force data 134, output data 136 and/or input data 138) are loaded into shared memory 130. At 714, the cache memory 140 of the I/O processor 120 is loaded with infrequently changed data comprising at least a portion of the shared memory 130 (e.g., I/O force data 134). At 720, a determination is made by the I/O processor 120 as to whether an update command message has been received from the processor 110. If the determination at 720 is NO, processing continues at 750. If the determination at 720 is YES, at 724 the I/O processor 120 initiates at blocked write to the address(es) in shared memory 130 associated with the update command (e.g., shared memory address(es) whose value(s) changed). At 730, at determination is made at to whether data from the address(es) associated with the update command are stored in cache memory 140 (e.g., by cache memory controller hardware, firmware and/or software (not shown)). If the determination at 730 is NO, processing continues at 750. If the determination at 740 is YES, at 740, the cache memory 140 is updated (e.g., data read from shared memory 130). At 750, output value(s) are retrieved by the I/O processor 120 from the shared memory 130. At 760, a determination is made whether data associated with the output(s) (e.g., I/O force data 134, for example, force off mask 204 and/or force on mask 208) is stored in the cache memory 140. If the determination at 760 is YES, processing continues at 780. If the determination at 760 is NO, at 770, the cache memory 140 is loaded with force data associated with the output(s) from shared memory 130. At 780, the output(s) are processed (e.g., the output value(s) retrieved from the shared memory 130 can be logically AND'd with the force off mask 204 and the result thereof logically OR'd with the force on mask 208). At 790, the processed output value is used to effect control of the process (e.g., transferred to an I/O module). At 794, a determination is made as to whether the I/O processor is done (e.g., control program execution completed). If the determination at 794 is NO, processing continues at 720. If the determination at 794 is YES, no further processing occurs.

Exemplary Control System

Figure 9:
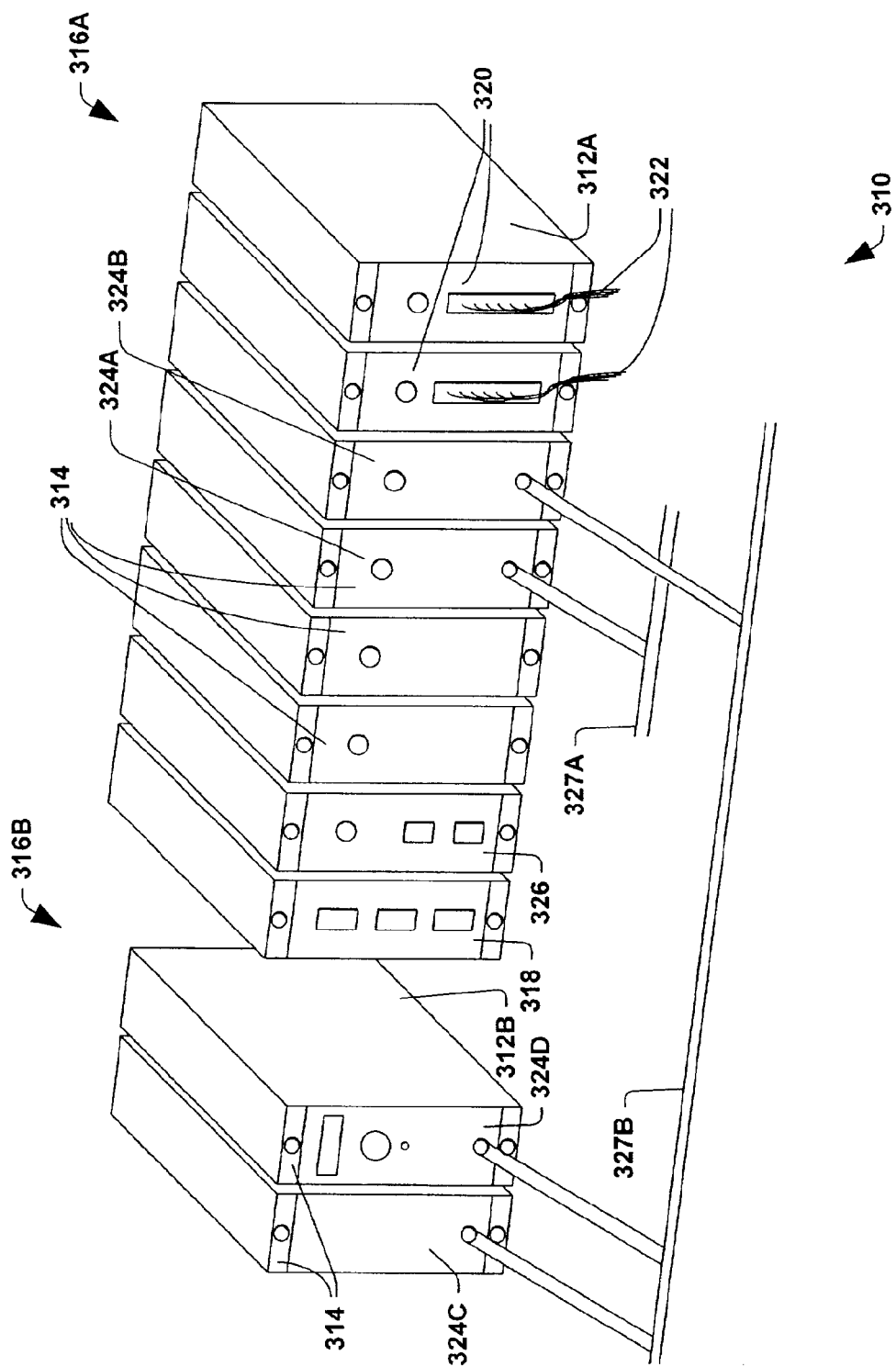
FIG. 9 is a perspective illustration of an industrial controller having multiple functional modules included within several racks joined by communication links.

The methods and systems of the present invention may be employed in association with many forms of control systems. In order to provide context for the various applications in which the aspects of the invention may be carried out, an exemplary control system is now illustrated and described with respect to FIGS. 9 and 10. However, it will be appreciated that the various aspects of the invention may be employed in association with controllers and control systems other than those illustrated and described herein. A distributed industrial control system 310 suitable for use with the present invention provides a first and second rack 312A and 312B for holding a number of functional modules 314 electrically interconnected by backplanes 316A and 316B running along the rear of the racks 312A and 312B respectively. Each module 314 may be individually removed from the rack 312A or 312B thereby disconnecting it from its respective backplane 316 for repair or replacement and to allow custom configuration of the distributed system 310.

The modules 314 within the rack 312A may include, for example, a power supply module 318, a processor module 326, two communication modules 324A and 324B and two I/O modules 320. A power supply module 318 receives an external source of power (not shown) and provides regulated voltages to the other modules 314 by means of conductors on the backplane 316A. The I/O modules 320 provide an interface between inputs from, and outputs to external equipment (not shown) via cabling 322 attached to the I/O modules 320 at terminals on their front panels. The I/O modules 320 convert input signals on the cables 322 into digital words for transmission on the backplane 316A. The I/O modules 320 also convert other digital words from the backplane 316A to the necessary signal levels for control of equipment.

The communication modules 324A and 324B provide a similar interface between the backplane 316A and one of two external high speed communication networks 327A and 327B. The high speed communication networks 327A and 327B may connect with other modules 314 or with remote racks of I/O modules 320, controller configuration tools or systems, or the like. In the example illustrated in FIG. 9, the high speed communication network 327A connects with backplane 316A via the communication module 324A, whereas the high speed communication network 327B connects the communication module 324B with communication modules 324C and 324D in rack 312B. The processor module 326 processes information provided by the communication modules 324A and 324B and the I/O modules 320 according to a stored control program or routine, and provides output information to the communication module 324 and the I/O modules 320 in response to that stored program and received input messages.

Figure 10:
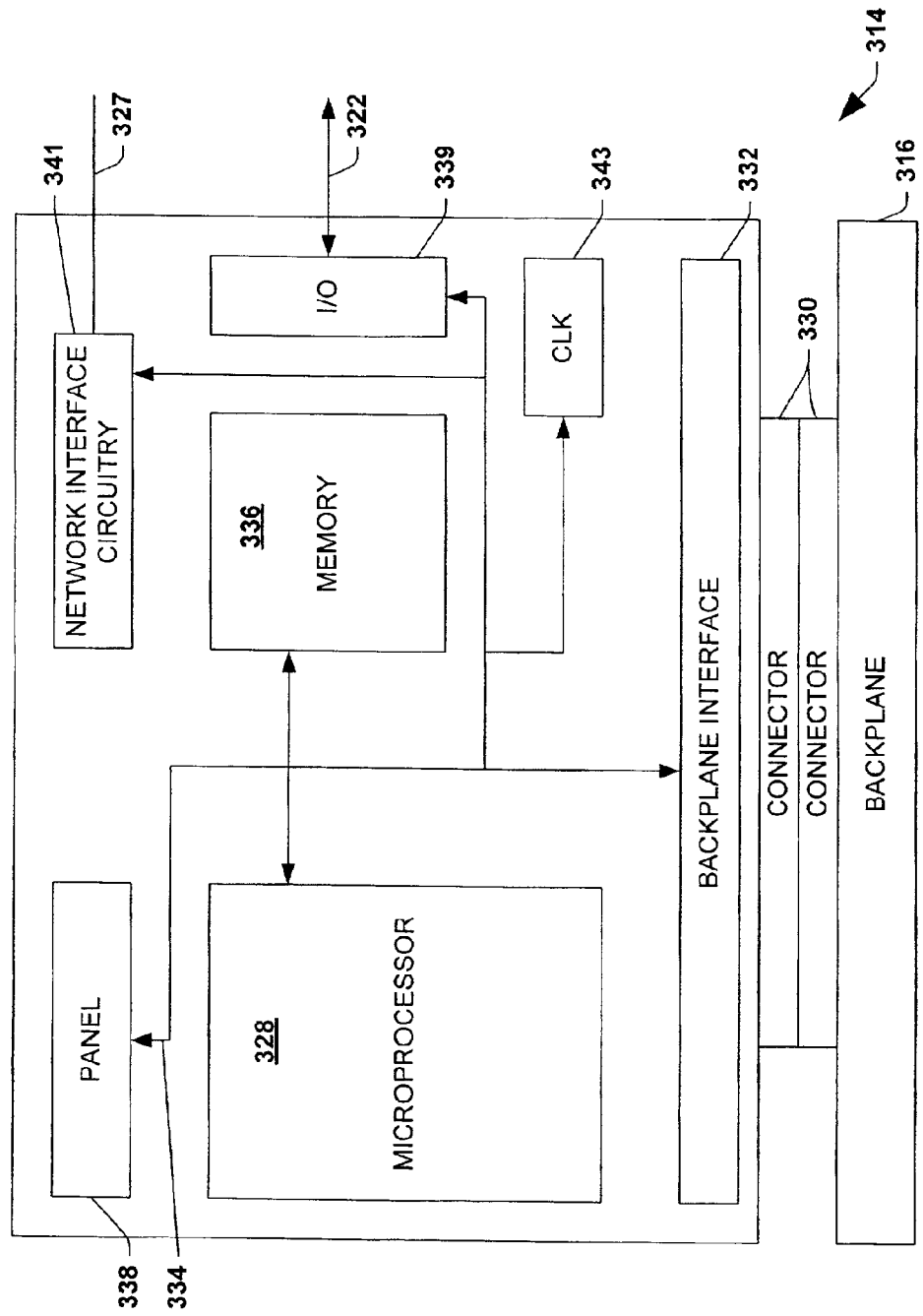
FIG. 10 is a schematic illustration of a single functional module of FIG. 9 illustrating its connection to a common backplane and communication links to communicate with other modules.

Referring also to FIG. 10, each functional module 314, is attached to the backplane 316 by means of a separable electrical connector 330 that permits the removal of the module 314 from the backplane 316 so that it may be replaced or repaired without disturbing the other modules 314. The backplane 316 provides the module 314 with both power and a communication channel to the other modules 314. Local communication with the other modules 314 through the backplane 316 is accomplished by means of a backplane interface 332 which electrically connects the backplane 316 through connector 330. The backplane interface 332 monitors messages on the backplane 316 to identify those messages intended for the particular module 314, based on a message address being part of the message and indicating the message destination. Messages received by the backplane interface 332 are conveyed to an internal bus 334 in the module 314.

The internal bus 334 joins the backplane interface 332 with a memory 336, a microprocessor 328, front panel circuitry 338, I/O interface circuitry 339 (if the module is an I/O module 320) and communication network interface circuitry 341 (if the module is a communication module 324). The microprocessor 328 may be a general purpose microprocessor providing for the sequential execution of instructions included within the memory 336 and the reading and writing of data to and from the memory 336 and the other devices associated with the internal bus 334. The microprocessor 328 includes an internal clock circuit (not shown) providing the timing of the microprocessor 328 but may also communicate with an external clock 343 of improved precision. This clock 343 may be a crystal controlled oscillator or other time standard including a radio link to an external time standard. The precision of the clock 343 may be recorded in the memory 336 as a quality factor. The panel circuitry 338 includes status indication lights such as are well known in the art and manually operable switches such as for locking the module 314 in the off state.

The memory 336 may comprise control programs or routines executed by the microprocessor 328 to provide control functions, as well as variables and data necessary for the execution of those programs or routines. For I/O modules 320, the memory 336 may also include an I/O table holding the current state of inputs and outputs received from and transmitted to the industrial controller 310 via the I/O modules 320. The module 314 may be adapted to perform the various methodologies of the invention, via hardware configuration techniques and/or by software programming techniques.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. A programmable control system, comprising:
   a processor for executing a control program;
   a shared memory storing data associated with the control program, at least one of data associated with sensing and actuating devices, and forced I/O values; and,
   an I/O processor for performing at least one of input and output functions, the I/O processor and the processor operatively coupled to the shared memory, the I/O processor operatively coupled to a cache memory storing at least a portion of the forced I/O values stored in the shared memory, the I/O processor storing input values in the shared memory based at least in part upon forced I/O values stored in the cache memory, the I/O processor determining output values based at least in part upon forced I/O values stored in the cache memory.

2. The programmable control system of claim 1, the processor sending a message to the I/O processor in the event a forced I/O value has been altered during execution of the control program, the I/O processor causing the cache memory to be refreshed in response to receipt of the message.

3. The programmable control system of claim 1, the I/O processor performing a blocked write to refresh the cache memory in response to receipt of the message.

4. The programmable control system of claim 1, the forced I/O values comprising at least one of binary and analog values.

5. The programmable control system of claim 1, the processor and I/0 processing being coupled by at least one of a serial communications backplane bus, a parallel communications backplane bus and a network.

6. A programmable control system, comprising:
   a processor for executing a control program;
   a shared memory storing data associated with the control program and infrequently changed data; and,
   an I/O processor for performing at least one of input and output functions, the I/O processor and the processor operatively coupled to the shared memory, the I/O processor operatively coupled to a cache memory storing at least a portion of the infrequently changed data stored in the shared memory, the I/O processor utilizing the infrequently changed data stored in the cache memory.

7. The programmable control system of claim 6, the infrequently changed data being at least one of I/O force data, configuration data, I/O fail safe information, a connection table, an output keep alive table and information associated with an input time-out.

8. The programmable control system of claim 6, the processor sending a message to the I/O processor in the event the infrequently changed data has been altered during execution of the control program, the I/O processor causing the cache memory to be refreshed in response to receipt of the message.

9. A programmable control system, comprising:

means for executing a control program;

means for storing data representing status of at least one of sensing and actuating devices, the means for storing further storing data associated with forced values for the at least one of sensing and actuating devices;

means for performing at least one of input and output functions, the means for performing at least one of input and output functions and the means for executing a control program operatively coupled to the means for storing data, the means for performing at least one of input and output functions operatively coupled to a cache memory means storing at least a portion of the data associated with forced values for the at least one of sensing and actuating devices, the means for performing at least one of input and output functions storing input values in the memory means based at least in part upon forced I/O values stored in the cache memory means, the means for performing at least one of input and output functions determining output values based at least in part upon forced I/O values stored in the cache memory.

10. A method for forcing an I/O values in an industrial control environment, comprising:

loading a cache with forcing information associated with a forced input or output;

receiving information associated with an input from a sensing device;

retrieving information associated with an output to an actuating device; and, forcing the input or output based at least in part upon the forcing information loaded in the cache.

11. The method of claim 10, further comprising:

refreshing the cache if the forcing information is altered during control program execution.

12. The method of claim 10, loading the cache with forcing information comprising retrieving forcing information from a shared memory and loading the forcing information into the cache using an I/O processor.

13. The method of claim 12, retrieving forcing information from the shared memory comprising receiving a message in the I/O processor indicating that the forcing information in the shared memory has been altered, and refreshing at least a portion of the cache with the altered forcing information.

14. The method of claim 13, refreshing at least a portion of the cache comprising reading the altered forcing information from the shared memory and performing a blocked write to refresh the cache memory with the altered forcing information.

15. The method of claim 12, forcing the input comprising providing a forced input to the shared memory based on the forcing information using the I/O processor.

16. The method of claim 12, forcing the output comprising providing a forced output to the actuating device based on the forcing information using the I/O processor.

17. A method of selectively forcing I/O in a control system having an I/O processor and a control processor associated with a shared memory, the method comprising:

selectively storing a forced input value to the shared memory according to forcing information in a cache associated with the I/O processor;

selectively providing a forced output value to an actuating device according to the forcing information in the cache using the I/O processor; and obtaining altered forcing information from the shared memory using the I/O processor and storing the altered forcing information in the cache according to a message from the control processor.

18. The method of claim 17, storing the altered forcing information in the cache comprising refreshing the cache by writing the altered forcing information to a virtual memory location.

19. The method of claim 17, comprising writing the altered forcing information to the shared memory and sending the message to the I/O processor using the control processor, the message indicating alteration of the forcing information in the shared memory.

* * * * *